United States Patent
Park et al.

(10) Patent No.: US 10,304,571 B2
(45) Date of Patent: May 28, 2019

(54) MAGNETIC JACK TYPE IN-VESSEL CONTROL ELEMENT DRIVE MECHANISM

(71) Applicant: Kepco Engineering & Construction Company, Inc., Gyeonggi-do (KR)

(72) Inventors: Jin Seok Park, Daejeon (KR); Yong Tae Jang, Daejeon (KR); Myoung Goo Lee, Daejeon (KR); Sang Gyoon Chang, Daejeon (KR); Dae Hee Lee, Daejeon (KR)

(73) Assignee: KEPCO ENGINEERING & CONSTRUCTION COMPANY, INC., Gyeonggi-Do (KR)

( * ) Notice: Subject to any disclaimer, the term of this patent is extended or adjusted under 35 U.S.C. 154(b) by 483 days.

(21) Appl. No.: 14/717,830

(22) Filed: May 20, 2015

(65) Prior Publication Data

US 2015/0348653 A1 Dec. 3, 2015

(30) Foreign Application Priority Data

May 30, 2014 (KR) .......................... 10-2014-0066513

(51) Int. Cl.
*G21C 7/12* (2006.01)
*G21C 7/14* (2006.01)

(52) U.S. Cl.
CPC ................. *G21C 7/12* (2013.01); *G21C 7/14* (2013.01); *Y02E 30/39* (2013.01)

(58) Field of Classification Search
CPC ... G21C 7/08; G21C 7/10; G21C 7/12; G21C 7/14; G21C 7/16; G21C 7/18
See application file for complete search history.

(56) References Cited

U.S. PATENT DOCUMENTS

| 3,299,302 | A | * | 1/1967 | Frisch | ....................... G21C 7/14 |
| | | | | | 310/12.04 |
| 3,902,963 | A | * | 9/1975 | Bertone | ................... G21C 7/12 |
| | | | | | 310/14 |
| 2012/0148007 | A1 | * | 6/2012 | Allen | ....................... G21C 7/12 |
| | | | | | 376/229 |

FOREIGN PATENT DOCUMENTS

| KR | 10-2011-0137535 | 12/2011 |
| KR | 10-2011-1036970 | 12/2011 |

(Continued)

OTHER PUBLICATIONS

Notice of Allowance, dated Sep. 6, 2015, issued in Korean Patent Application No. 10-2014-0066513.

(Continued)

*Primary Examiner* — Sharon M Davis
(74) *Attorney, Agent, or Firm* — Nixon Peabody LLP; Jeffrey L. Costellia (57) ABSTRACT

A magnetic jack type in-vessel control element drive mechanism includes: an upper coil assembly which includes a first sleeve configured to coaxially wrap a control element drive shaft, a first coil, and a first coil housing which is externally coupled to the first sleeve; a lower coil assembly which includes a second sleeve configured to coaxially wrap the control element drive shaft, a second coil, and a second coil housing which is externally coupled to the second sleeve, wherein the lower coil assembly is located under the upper coil assembly, a connecting member which connects the upper coil assembly and the lower coil assembly; a support tube which extends downward from the lower coil assembly; a motor assembly which is located between the control element drive shaft, and the first and second sleeves; and an anti-separation cap which prevents separation of the motor assembly.

5 Claims, 8 Drawing Sheets

(56) References Cited

FOREIGN PATENT DOCUMENTS

| KR | 10-1102181 | 12/2011 |
|---|---|---|
| KR | 10-2012-0086904 | 8/2012 |
| KR | 10-2013-0140063 | 12/2013 |
| WO | 2012/078939 | 6/2012 |

OTHER PUBLICATIONS

Final Office Action issued in KR Patent Application No. 10-2014-0066513 dated Mar. 12, 2015, including an English translation, 7 pages.

* cited by examiner

PRIOR ART

FIG. 1

PRIOR ART

MAGNETIC JACK TYPE IN-VESSEL CONTROL ELEMENT DRIVE MECHANISM

CROSS-REFERENCE TO RELATED PATENT APPLICATION

This application claims the benefit of Korean Patent Application No. 10-2014-0066513, filed on May 30, 2014, in the Korean Intellectual Property Office, the disclosure of which is incorporated herein in its entirety by reference.

BACKGROUND OF THE INVENTION

1. Field of the Invention

One or more exemplary embodiments relates to a magnetic jack type in-vessel control element drive mechanism, and more particularly, to a magnetic jack type in-vessel control element drive mechanism which makes a control element assembly move up and down through magnetic force, minimize the loss of magnetic force, simplify the assembly process and be operable under high-temperature, high-pressure and high-radiation conditions.

The present invention is derived from research conducted as part of the Nuclear Power Core Technology Development Program by the Ministry of Trade, Industry & Energy [Project Serial Number: 20131510101680, Title of Research Project: Development of Top-Mounted ICI System and In-Vessel Control Element Drive Mechanism for Severe Accident Mitigation Design.

2. Description of the Related Art

A control element drive mechanism is provided to control the power of a nuclear reactor and is classified as, for example, a magnetic-jack type control element drive mechanism, a ball-screw type control element drive mechanism, and a hydraulic type control element drive mechanism. The present invention relates to a magnetic jack type control element drive mechanism.

Figure 1:
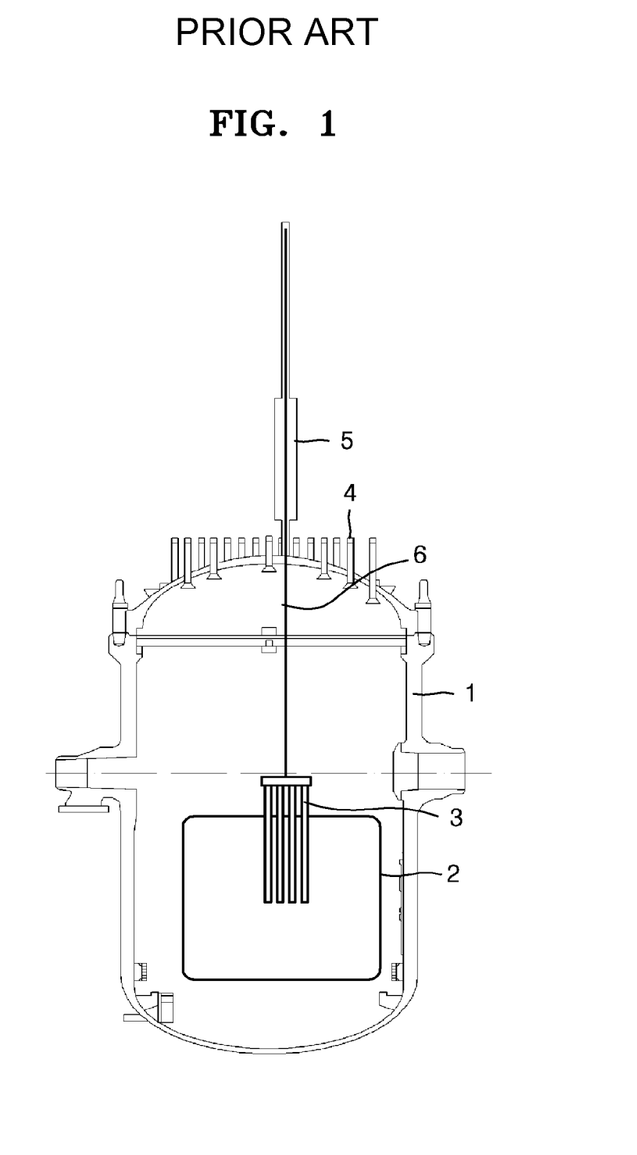
FIG. 1 is a conceptual installation view of a conventional control element drive mechanism.
Figure 2:
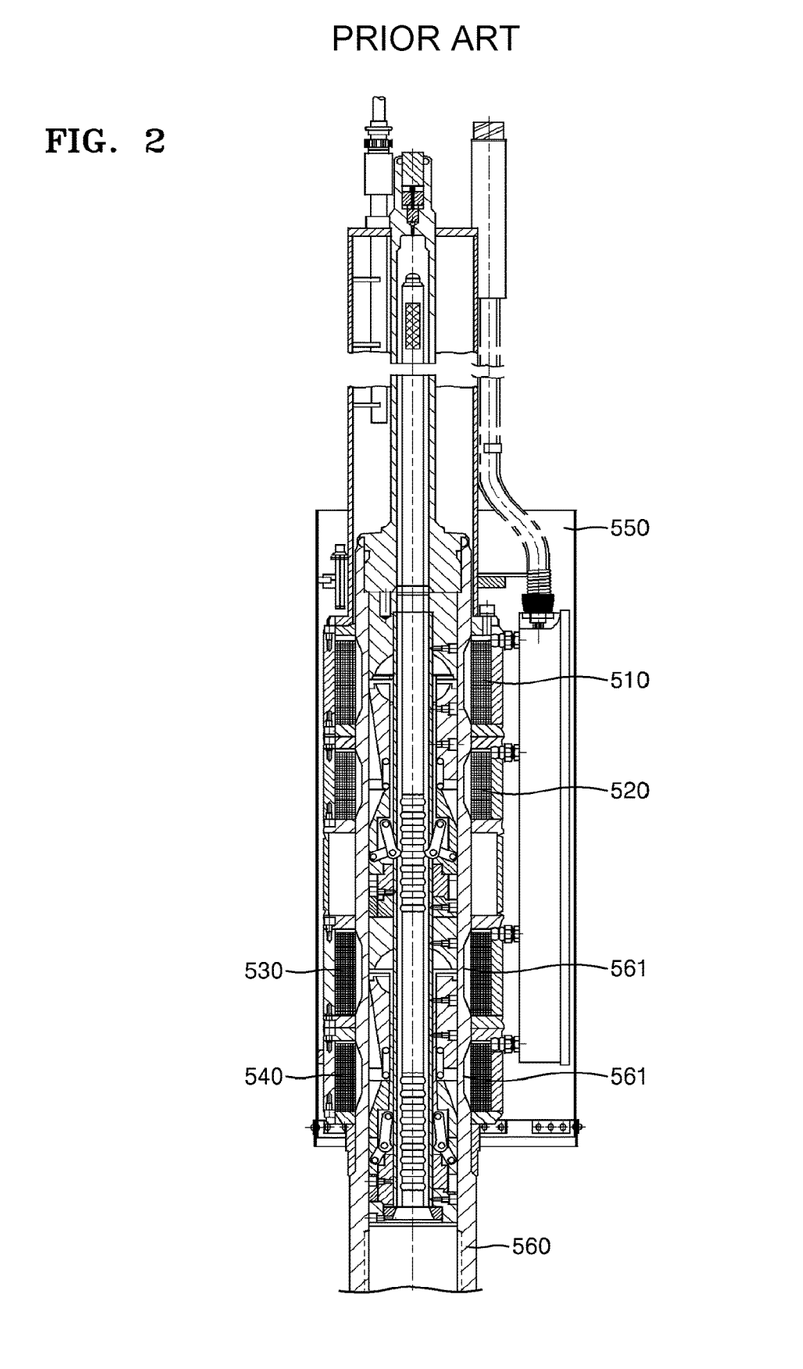
FIG. 2 is a schematic cross-sectional view of a conventional control element drive mechanism.

FIG. 1 is a conceptual installation view of a conventional control element drive mechanism, and FIG. 2 is a schematic cross-sectional view of the conventional control element drive mechanism.

As shown in FIG. 1, a nuclear fuel assembly 2 and a control element 3 are placed in a nuclear reactor 1. The control element 3 controls the fission of the nuclear fuel by adjusting the number of neutrons absorbed by a nuclear fuel. The control element 3 is vertically driven up and down by the control element drive mechanism 5. For the installation of the control element drive mechanism 5, a nozzle 4 is placed on a top portion of the nuclear reactor 1.

The control element drive mechanism 5 includes four coils, i.e., an upper lifting (UL) coil 510, an upper gripper (UG) coil 520, a lower lifting (LL) coil 530, and a lower gripper (LG) coil 540, and controls the vertical movement of the control element 3 by controlling magnetic force generated by the coils.

However, the conventional control element drive mechanism has a drawback of requiring a cooling system which provides cooling air to remove the heat of the coils during operation.

Moreover, a motor assembly is located inside a motor housing 560, and at the center of the motor assembly, a drive shaft 6 connected to the control element 3 is placed. The considerable amount of magnetic flux generated by the above-mentioned driving coils is not transferred to the motor assembly but bypasses through the motor housing 560, thereby causing a reduction in magnetic force. To compensate for such reduction in magnetic force, grooves 561 are formed on an outer circumferential surface of the motor housing 560. However, the grooves 561 may not compensate enough for the loss of magnetic force.

Also, small nuclear reactors, which have drawn much attention recently, often require control element drive mechanisms installed inside the nuclear reactor according to system requirements. Under these circumstances, usability of the control element drive mechanism under the conditions of much higher temperature, pressure and radiation is more required than in conventional nuclear reactors. Therefore, there is a demand for a new control element drive mechanism which is different from conventional control element drive mechanisms.

SUMMARY OF THE INVENTION

One or more exemplary embodiments include a magnetic jack type in-vessel control element drive mechanism which minimizes loss of magnetic force, simplifies the assembly process and is operable under high-temperature, high-pressure and high-radiation conditions.

Additional aspects will be set forth in part in the description which follows and, in part, will be apparent from the description, or may be learned by practice of the presented embodiments.

According to one or more exemplary embodiments, a magnetic jack type in-vessel control element drive mechanism includes: an upper coil assembly which comprises a first sleeve configured to coaxially wrap a control element drive shaft, a first coil, and a first coil housing which is externally coupled to the first sleeve so as to have a first reception portion that receives the first coil; a lower coil assembly which comprises a second sleeve configured to coaxially wrap the control element drive shaft, a second coil, and a second coil housing which is externally coupled to the second sleeve so as to have a second reception portion that receives the second coil, wherein the lower coil assembly is located under the upper coil assembly; a connecting member which connects the upper coil assembly and the lower coil assembly; a support tube which extends downward from the lower coil assembly; a motor assembly which is located between the control element drive shaft, and the first and second sleeves; and an anti-separation cap which prevents separation of the motor assembly, has a through-hole penetrated by the control element drive shaft, and is connected to a top portion of the upper coil assembly.

In some embodiments, the first and second sleeves and, the connecting member, and the support tube have an identical inner diameter.

In some embodiments, the first and second sleeves and, the connecting member and the support tube contact together to constitute a pipe.

In some embodiments, each of the first coil and the second coil is a mineral-insulated coil.

In some embodiments, each of the first and second coil housings is formed of martensitic stainless steel, and each of the first and second sleeves is formed of martensitic stainless steel, austenitic stainless steel, or nickel alloy.

BRIEF DESCRIPTION OF THE DRAWINGS

These and/or other aspects will become apparent and more readily appreciated from the following description of the embodiments, taken in conjunction with the accompanying views of which.

DETAILED DESCRIPTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description The present invention relates to a magnetic jack type control element drive mechanism. A control element drive mechanism according to an embodiment of the present invention is provided and driven as an in-vessel type.

Hereinafter, exemplary embodiments of the present invention will be explained in detail by referring to the attached drawings.

Figure 3:
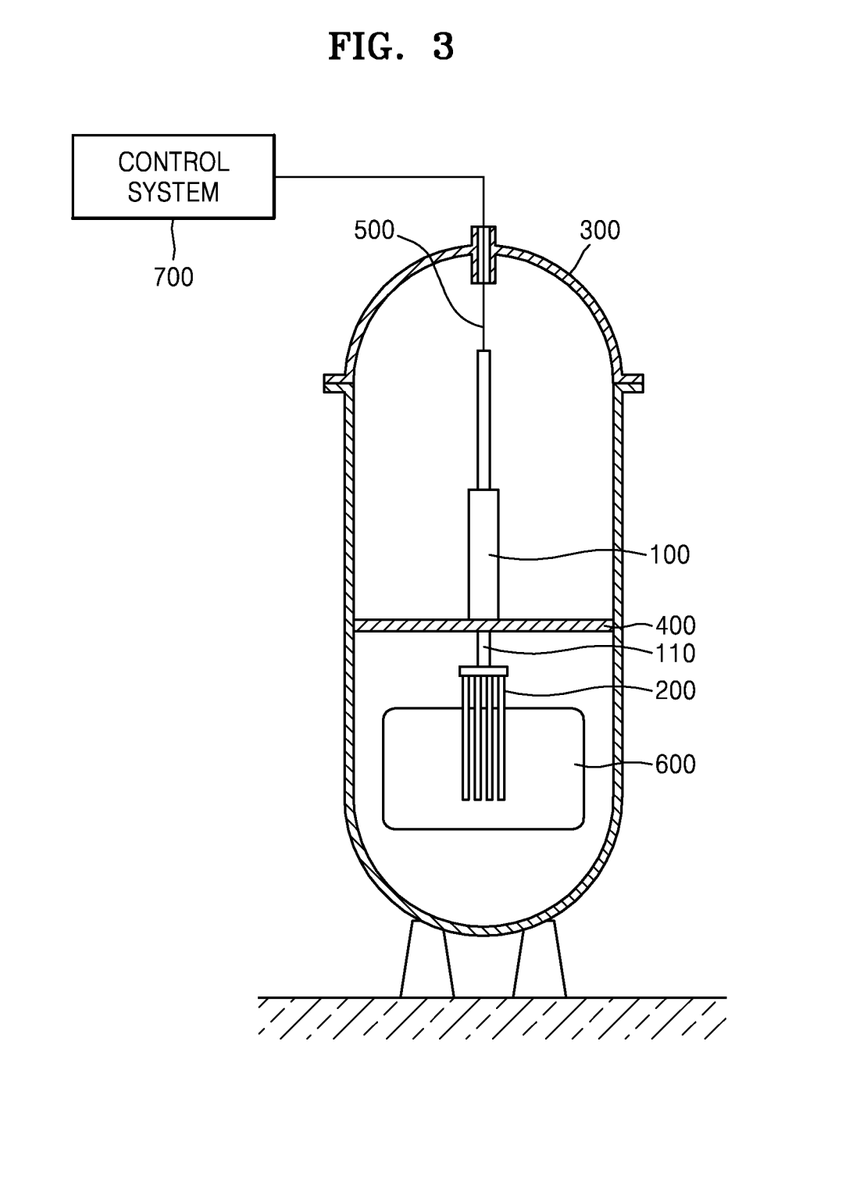
FIG. 3 is a conceptual installation view of an in-vessel control element drive mechanism.
Figure 4:
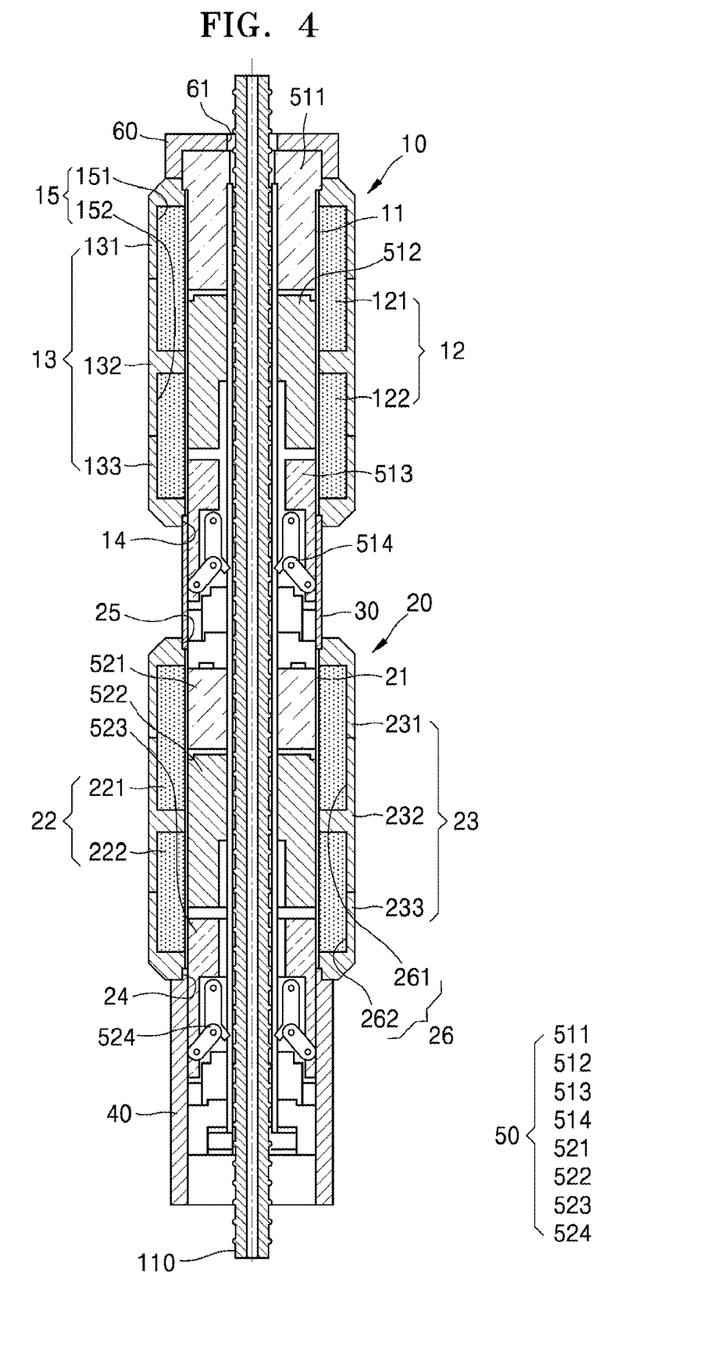
FIG. 4 is a cross-sectional view of a control element drive mechanism according to an embodiment of the present invention.
Figure 5:
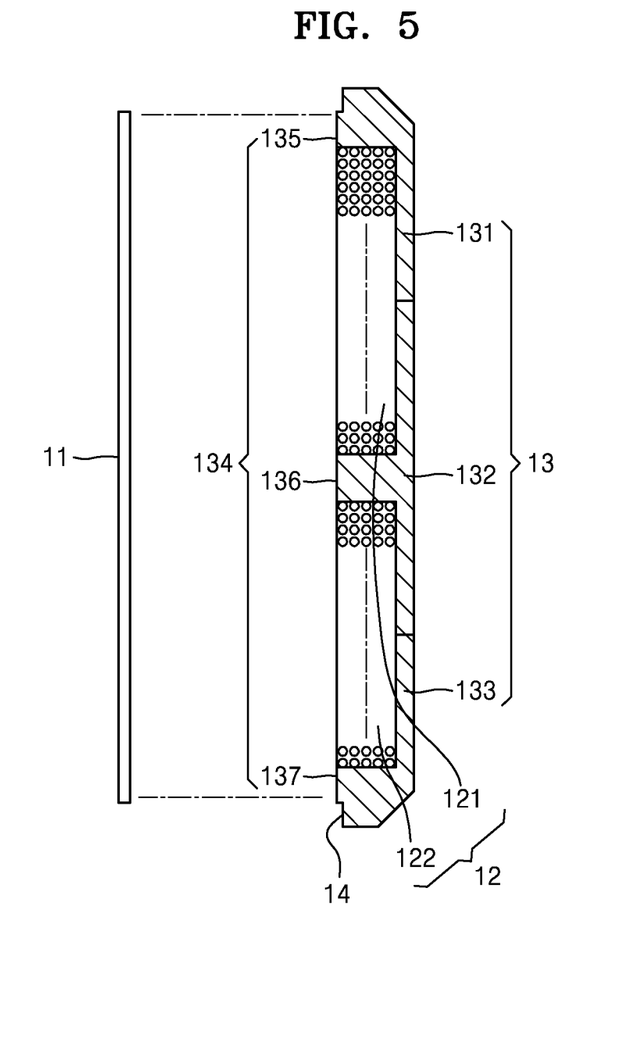
FIG. 5 is a cross-sectional view of an upper coil assembly.
Figure 6:
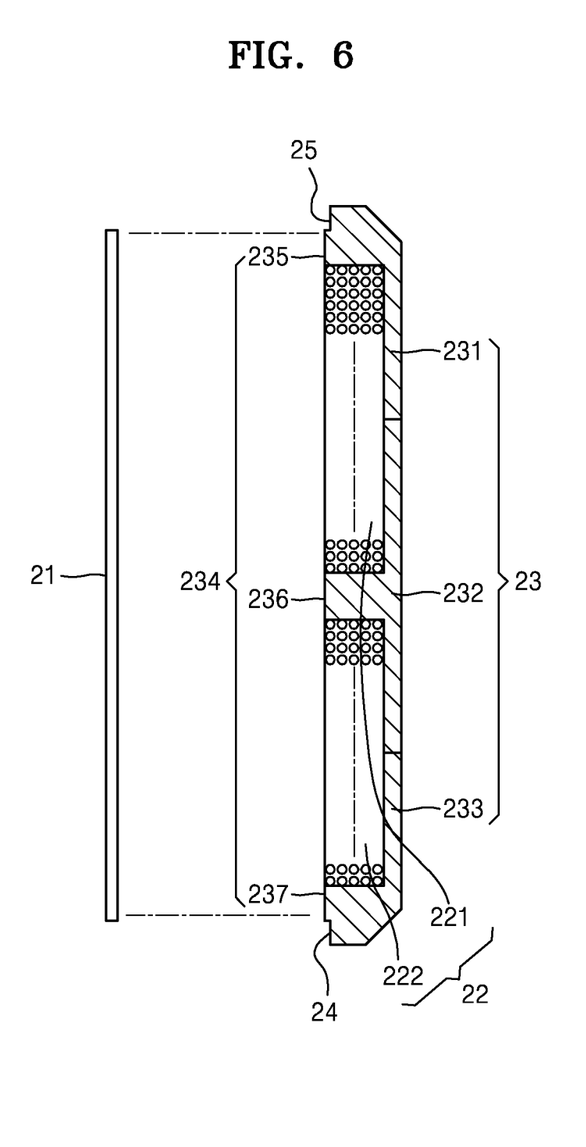
FIG. 6 is a cross-sectional view of a lower coil assembly.
Figure 7:
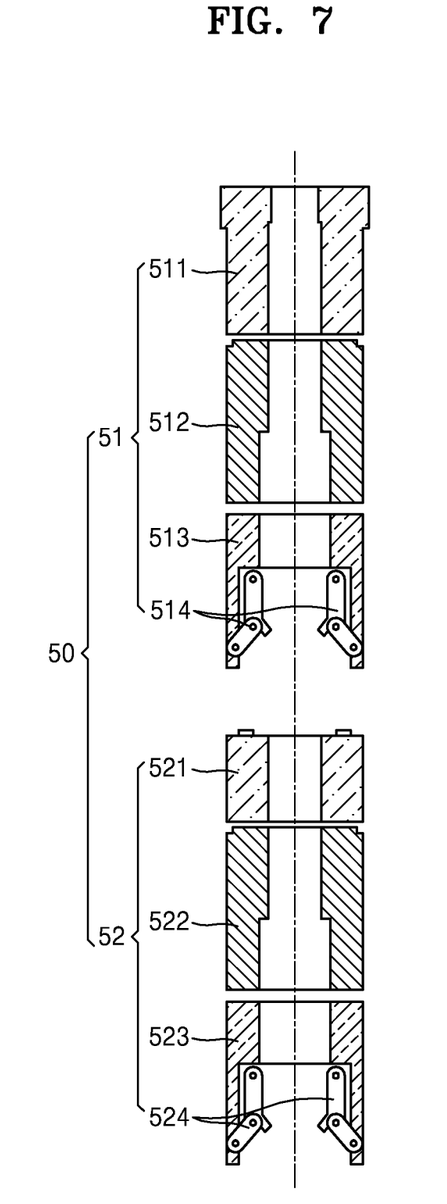
FIG. 7 is a cross-sectional view of a motor assembly.
Figure 8:
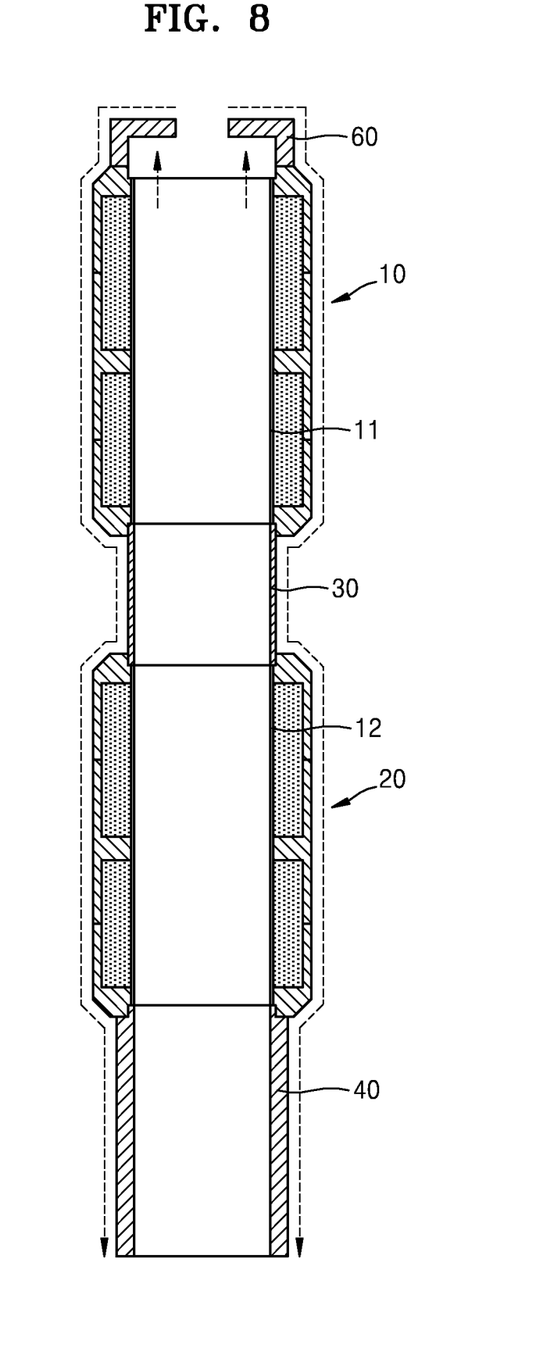
FIG. 8 is a schematic cross-sectional view which shows a shock transfer path when the control element drive mechanism is driven.

FIG. 3 is a conceptual view of an in-vessel control element drive mechanism installed in a nuclear reactor, FIG. 4 is a cross-sectional view of a control element drive mechanism according to an embodiment of the present invention, FIG. 5 is a cross-sectional view of an upper coil assembly, and FIG. 6 is a cross-sectional view of a lower coil assembly, FIG. 7 is a cross-sectional view of a motor coil assembly, and FIG. 8 is a schematic cross-sectional view of a shock transfer path when the control element drive mechanism is driven.

As shown in FIG. 3, a control element drive mechanism 100 may be installed inside a reactor 300. Inside the reactor 300, a nuclear fuel assembly 600 is placed, and a control element 200 is connected to a control element drive shaft 110. The control element 200 adjusts the number of neutrons so as to control the fission of the nuclear fuel. The control element drive shaft 110 is configured to be driven vertically by the control element drive mechanism 100 to move the control element 200 up and down.

Inside the reactor 300, a reactor internal structure 400 is placed to install the control element drive mechanism 100. As necessary, a separate support member (not shown) may be installed additionally onto an upper part of the control element drive mechanism 100 to prevent the vibration caused by external force.

A cable 500 for providing power supply to the control element drive mechanism 100 is connected to a control system 700 configured outside the reactor 300 while penetrating a reactor head. In some embodiments, the cable 500 may be designed to penetrate the side of the reactor 300, as needed.

As shown in FIG. 4, the control element drive mechanism 100 according to an embodiment of the present invention includes an upper coil assembly 10, a lower coil assembly 20, a connecting member 30, a support tube 40, a motor assembly 50, and an anti-separation cap 60.

The upper coil assembly 10 includes a first sleeve 11, a first coil 12 and a first coil housing 13.

The first sleeve 11 coaxially wraps around the control element drive shaft 110. The space between the control element drive shaft 110 and first sleeve 11 provides the space to which a motor assembly 50 is accepted. The motor assembly 50 coaxially wraps around the control element drive shaft 110. The first sleeve 11 receives the first coil 12 together with the first coil housing 13, and an inner circumferential surface of the first sleeve 11 guides the motor assembly 50.

The first coil housing 13 is externally coupled to the first sleeve 11 outside the first sleeve 11. The first coil housing 13 and the first sleeve 11 constitute a first reception part 15 that receives the first coil 12.

The first coil 12 includes a first lifting coil 121 which is located in an upper portion of the upper coil assembly 10 and a first latch coil 122 which is located in a lower portion of the upper coil assembly 10. The first reception part 15 includes a first upper reception part 151 which receives the first lifting coil 121 and a first lower reception part 152 which receives the first latch coil 122.

The first lifting coil 121 and the first latch coil 122 respectively correspond to an upper lifting (UL) coil and an upper gripper coil (UG) coil of a conventional 4-coil type magnetic jack type control element drive mechanism. Therefore, a detailed explanation on operations of the first lifting coil 121 and the first latch coil 122 is not provided herein.

The first coil 12 according to an embodiment of the present invention may be a mineral insulated (MI) coil. The conductor and insulation material of the MI coil are wrapped by sheath made of a nickel-alloy steel or stainless steel. Therefore the MI coil may be used without requiring sealing. The MI coil may be any MI coil that is publicly known. Therefore, a detailed explanation thereof is not provided here.

As shown in FIGS. 4 and 5, the first coil housing 13 includes a first upper housing 131, a first middle housing 132, and a first lower housing 133. The first upper housing 131 and the first middle housing 132 are coupled together bottom to top, to form the first upper reception part 151 which receives the first lifting coil 121. Although in the present embodiment of the present invention, the first coil housing 13 includes the first upper housing 131, the first middle housing 132, and the first lower housing 133, the number of those pieces may be altered.

In some embodiments, the first middle housing 132 and the first lower housing 133 are coupled together bottom to top, to form the first lower reception part 152 which receives the first latch coil 122.

In other words, when the first upper housing 131, the first middle housing 132, and the first lower housing 133 are coupled together, the first upper reception part 151 and the first lower reception part 152 may be formed in the form of a groove, and an inner circumferential surface of the resultant structure forms a first coupling surface 134 that is to surface-contact an outer circumferential surface of the first sleeve 11.

The first coupling surface 134 includes a first upper coupling surface 135 which is formed on the first upper housing 131, a first middle coupling surface 136 which is formed on the first middle housing 132, and a first lower coupling surface 137 which is formed on the first lower housing 133.

The lower coil assembly 20 is located under the upper coil assembly 10, and is similar to the upper coil assembly 10 in configuration. In detail, the lower coil assembly 20 includes a second sleeve 21, a second coil 22 and a second coil housing 23.

The second sleeve 21, like the first sleeve 11, coaxially wraps around the control element drive shaft 110. The space between the control element drive shaft 110 and the second sleeve 21 provides the space to which the motor assembly 50 is accepted. The control element drive shaft 110 is located inside the motor assembly 50.

The second sleeve 21, like the first sleeve 11, receives the second coil 22 together with the second coil housing 23, and an inner circumferential surface of the second sleeve 21 may guide the motor assembly 50.

The second coil housing 23 is externally coupled to an outer surface of the second sleeve 21. The second coil housing 23 and the second sleeve 21 constitutes a second reception part 26 that receives the second coil 22.

The second coil 22 includes a second lifting coil 221 which is located in an upper portion of the lower coil assembly 20 and a second latch coil 222 which is located in a lower portion of the lower coil assembly 20. The second reception part 26 includes a second upper reception part 261 which receives the second lifting coil 221 and a second lower reception part 262 which receives the second latch coil 222.

The second lifting coil 221 and the second latch coil 222 respectively correspond to a LL coil and a LG coil of the aforementioned conventional 4-coil type magnetic jack type control element drive mechanism. Therefore, a detailed explanation on operations of the second lifting coil 221 and the second latch coil 222 is not provided herein.

Like the first coil 12, the second coil 22 used in an embodiment of the present invention may be a mineral-insulated coil. As the mineral-insulated coil has been explained above, a specific explanation thereof is not provided herein, to avoid redundancy.

As shown in FIGS. 4 and 6, the second coil housing 23 includes a second upper housing 231, a second middle housing 232, and a second lower housing 233. The second upper housing 231 and the second middle housing 232 are coupled together bottom to top, to form the second upper reception part 261 which receives the second lifting coil 221. Although in the present embodiment of the present invention, the second coil housing 23 includes the second upper housing 231, the second middle housing 232, and the second lower housing 233, the number of those pieces may be altered.

In some embodiments, the second middle housing 232 and the second lower housing 233 are coupled together bottom to top, to form the second lower reception part 262 which receives the second latch coil 222.

In other words, when the second upper housing 231, the second middle housing 232, and the second lower housing 233 are coupled together, the second upper reception part 261 and the second lower reception part 262 may be formed in the form of a groove, and an inner circumferential surface of the resultant structure forms a second coupling surface 234 that is to surface-contact an outer circumferential surface of the second sleeve 21.

The second coupling surface 234 includes a second upper coupling surface 235 formed on the second upper housing 231, a second middle coupling surface 236 formed on the second middle housing 232 and a second lower coupling surface 237 formed on the second lower housing 233.

In some embodiments, the first coil housing 13 and the second coil housing 23 may be formed of martensitic stainless steel, and the first sleeve 11 and the second sleeve 21 may be formed of martensitic stainless steel, austenitic stainless steel or nickel alloy. These materials have more excellent corrosion resistance than carbon steel; therefore, when a housing formed of these materials is installed inside the reactor 300, it may endure harsh conditions of high-temperature, high-pressure and reactor coolant chemistry. In terms of magnetic force, because austenitic stainless steel and nickel alloy are non-magnetic materials, loss of magnetic flux which occurs with the conventional motor housing 560 may be completely eliminated. In other words, the magnetic flux is fully transferred to the motor assembly 50 without being lost to the first and second sleeves 11 and 12 increasing magnetic force compared to a conventional system. Martensitic stainless steel, austenitic stainless steel and nickel alloy are publicly known materials; therefore, a detailed explanation thereof is not provided herein.

In some embodiments, the first and second sleeves 11 and 21 may have a thickness of 0.2 mm to 1.0 mm in thickness. When their thickness is less than 0.2 mm, they may be deformed by external load; when their thickness is more than 1.0 mm, there may be less space allotted to the first and second coils 12 and 22 and the first and second coil housings 13 and 23.

The connecting member 30 connects the upper coil assembly 10 to the lower coil assembly 20. According to the embodiment of the present invention, the connecting member 30 is interlocked to the upper coil assembly 10 and lower coil assembly 20 in a screw manner. The connecting member 30 may have a top end that is interlocked with a first insert groove 14 which is located on a lower end of the first lower housing 133, and a bottom end that is interlocked with a second insert groove 25 which is located on an upper end of the second upper housing 231. The respective interlocking portions are processed to have screw crests, and are interlocked in a spiral way, providing a strong bond after interlocking.

According to the embodiments of the present invention, the connecting member 30 is interlocked with the upper coil assembly 10 and the lower coil assembly 20 in the screw manner; however, the interlocking method may vary, including using a flange method or a welding method. For example, when a flange method is used, a separate flange is formed on upper and lower portions of the connecting member 30, and then, connected to the first lower housing 133 and the second upper housing 231 by using bolts.

The support tube 40 extends downward from the lower coil assembly 20. The support tube 40 supports the weight of the entire control element drive mechanism which includes the upper coil assembly 10, the connecting member 30, and the lower coil assembly 20, and the control element. An upper end of the support tube 40 is interlocked with a support groove 24 which is located on a lower portion of the bottom of the second lower housing 233. The support tube 40 may be interlocked with the support groove 24 by using various methods including a screw type method, a flange type method or a welding type method.

The motor assembly 50 is located in the space between the control element drive shaft 110 and the first and second sleeves 11 and 21. The motor assembly 50 includes an upper motor assembly 51 and a lower motor assembly 52.

As shown in FIG. 7, the upper motor assembly 51 includes a first stationary magnet 511, a first lifting magnet 512, a first latch magnet 513, and a first latch arm 514.

There is a space between the first stationary magnet 511 and the first lifting magnet 512, and between the first lifting magnet 512 and the first latch magnet 513. The space provides room for movement for the first lifting magnet 512 and the first latch magnet 513 when the first coil 12 generates magnetic force; and transfers driving force to the control element drive shaft 110 through the first latch arm 514.

The lower motor assembly 52 includes a second stationary magnet 521, a second lifting magnet 522, a second latch magnet 523, and a second latch arm 524.

The lower motor assembly 52 works the same way the upper motor assembly 51 does. There is a space between the second stationary magnet 521 and the second lifting magnet 522, and between the second lifting magnet 522 and the second latch magnet 523. The space provides room for movement for the second lifting magnet 522 and the second latch magnet 523 when the second coil 22 generates magnetic force; and transfers driving force to the control element drive shaft 110 through the second latch arm 524.

In some embodiments, the first latch arm 514 is connected to the first latch magnet and the second latch arm 524 is connected to the second latch magnet 523. The first and second latch arms 513 and 514 engage or disengage with the control element drive shaft 110 through the grooves provided on an outer circumferential surface of the control element drive shaft 110. This driving manner is performed according to a conventional 4-coil magnetic jack-type control element drive mechanism; therefore, a detailed explanation is not given.

The anti-separation cap 60 is connected to the upper portion of the upper coil assembly 10 to prevent the motor assembly 50 from separating. The anti-separation cap 60 has a through-hole 61, through which the control element drive shaft 110 penetrates. The motor assembly 50 receives a shock load along its axis triggered by the magnetic force of the first and second coils 12 and 22 during operation, but the anti-separation cap 60 prevents the motor assembly 50 from thrusting upward over the upper coil assembly 10.

As shown in FIG. 8, the shock load that has been transferred to the anti-separation cap 60 when the control element drive mechanism 100 is under operation, is transferred to the reactor internal structure 400 along the arrow direction. The anti-separation cap 60 and the upper coil assembly 10 may be coupled to each other through various methods such as a screw method, a flange method or a welding method.

Meanwhile, according to an embodiment of the present invention, the first sleeve 11, the second sleeve 21, the connecting member 30, and the support tube 40 have the same inner diameter. In some embodiments, the first and second sleeves 11 and 21, the connecting member 30, and the support tube 40 constitute a connected pipe while in contact when assembled, as shown in FIG. 4.

As shown in FIG. 4, the motor assembly 50 is located among the first and second sleeves 11 and 21, the connecting member 30, and the support tube 40 and the control element drive shaft 110. The first and second sleeves 11 and 21, the connecting member 30, and the support tube 40 have the same inner diameter, making it easier to design and assemble the motor assembly 50.

In some embodiments, the first and second sleeves 11 and 21, the connecting member 30, and the support tube 40 constitute a single pipe while in contact, reliably guiding the motor assembly 50 when the control element drive mechanism is under operation.

For example, the first latch magnet 513 is arranged to face an inner circumferential surface of a portion where the first sleeve 11 is connected to the connecting member 30, and the second latch magnet 523 is arranged to face the inner circumferential surface of a portion where the second sleeve 21 is connected to the support tube 40. In other words, the first sleeve 11, the connecting member 30, the second sleeve 21, and the support tube 40 are arranged in contact, acting as a guide pipe which allows the motor assembly 50 to slide smoothly.

As described above, the magnetic jack-type in-vessel control element drive mechanism 100 according to an embodiment of the present invention secures space to accept the motor assembly 50 between the control element drive shaft 110 and the first and second sleeve 11 and 21 by using the first and second sleeves 11 and 21 which wraps around the control element drive shaft 110; and houses the first and second coils 12 and 22 by coupling the first and second coil housings 13 and 23 outside the first and second sleeves 11 and 21.

Since magnetic flux generated by the first and second coils 12 and 22 is directly transferred to the motor assembly 50 through the first and second sleeves 11 and 21, the control element drive mechanism 100 increases magnetic force significantly thank to reduction of the leakage flux which is inevitable in a conventional motor housing.

In some embodiments, the magnetic jack-type reactor in-vessel control element drive mechanism 100 according to an embodiment of the present invention uses a MI coil as a the first and second coils 12 and 22. Therefore, even without separate sealing of a coil housing, the control element drive mechanism 100 is available for operation under high-pressure, high-temperature, high-radiation and submerged conditions.

In some embodiments, the control element drive mechanism 100 according to an embodiment of the present invention boosts work efficiency because of easy installation thanks to the simplified structure. Specifically, the control element drive mechanism 100 allows easy and quick construction by stacking the support tube 40, the lower coil assembly 20, the connecting member 30, and the upper coil assembly 10 in sequence, and by inserting the motor assembly 50 and the control element drive shaft 110 into the inner space.

A control element drive mechanism according to an embodiment of the present invention makes it possible to minimize the loss of magnetic force, to simplify the assembly process and to allow operation under high-pressure, high-temperature, high-radiation and submerged conditions.

Also, when the control element drive mechanism according to an embodiment of the present invention is installed inside a reactor, it is possible to prevent control rod ejection accidents; to decrease the risk of a loss-of-coolant accident by reducing the number of penetration tubes required for the installation of the control element drive mechanism onto the reactor vessel head; and to tremendously simplify the reactor upper structure by excluding a cooling system such as a cooling fan as opposed to the installation of the control element drive mechanism on the outside of the conventional reactor.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A magnetic jack control element drive mechanism, comprising:
   an upper coil assembly comprising a first sleeve configured to coaxially wrap a control element drive shaft, a first coil, and a first coil housing, wherein the first coil housing is connected to the first sleeve with a first reception portion of the first sleeve receiving the first coil between the first sleeve and the first coil housing;
   a lower coil assembly located under the upper coil assembly, the lower coil assembly comprising a second sleeve configured to coaxially wrap the control element drive shaft, a second coil, and a second coil housing, wherein the second coil housing is connected to the second sleeve with a second reception portion of the second sleeve receiving the second coil between the second sleeve and the second coil housing the second coil housing;
   a connecting screw which connects the first coil housing of the upper coil assembly with the second coil housing of the lower coil assembly;
   a support tube which extends downward from the lower coil assembly, wherein the first and second sleeves, the connecting screw, and the support tube have an identical inner diameter;
   a motor assembly which is located between the control element drive shaft, and the first and second sleeves, wherein the motor assembly comprises at least one stationary magnet, at least one lifting magnet, at least one latch magnet, and at least one latch arm; and
   an anti-separation cap configured to prevent upward movement of the motor assembly, the cap having a through-hole penetrated by the control element drive shaft, and being connected to a top portion of the upper coil assembly,
   wherein, a top end of the connecting screw is interlocked with a first insert groove which is located on a lower end of the first coil housing,
   a bottom end of the connecting screw is interlocked with a second insert groove which is located on an upper end of the second coil housing,
   an upper end of the support tube is interlocked with a support groove which is located on a bottom end of the second coil housing, and
   the first and second sleeves, the connecting screw, and the support tube together constitute a pipe.

2. The magnetic jack control element drive mechanism of claim 1, wherein each of the first coil and the second coil is a mineral-insulated coil.

3. The magnetic jack control element drive mechanism of claim 1, wherein each of the first and second coil housings is formed of martensitic stainless steel, and each of the first and second sleeves is formed of martensitic stainless steel, austenitic stainless steel, or nickel alloy.

4. The magnetic jack control element drive mechanism of claim 1, further comprising a first space between the at least one stationary magnet and the at least one lifting magnet, and a second space between the at least one lifting magnet and the at least one latch magnet.

5. The magnetic jack control element drive mechanism of claim 4, wherein the first and second spaces are configured to provide room for movement for the at least one lifting magnet and the at least one latch magnet when the first coil generates magnetic force.

* * * * *